United States Patent
BenHanokh et al.

(10) Patent No.: US 11,829,642 B2
(45) Date of Patent: Nov. 28, 2023

(54) MANAGING WRITE REQUESTS FOR DRIVES IN CLOUD STORAGE SYSTEMS

(71) Applicant: RED HAT, INC., Raleigh, NC (US)

(72) Inventors: Gabriel Zvi BenHanokh, Tel-Aviv (IL); Yehoshua Salomon, Kfar Saba (IL); Orit Wasserman, Mitzpe Aviv (IL)

(73) Assignee: RED HAT, INC., Raleigh, NC (US)

( * ) Notice: Subject to any disclaimer, the term of this patent is extended or adjusted under 35 U.S.C. 154(b) by 60 days.

(21) Appl. No.: 17/538,308

(22) Filed: Nov. 30, 2021

(65) Prior Publication Data
US 2023/0168839 A1  Jun. 1, 2023

(51) Int. Cl.
*G06F 3/06* (2006.01)
*G06F 12/0862* (2016.01)

(52) U.S. Cl.
CPC .......... *G06F 3/0659* (2013.01); *G06F 3/0613* (2013.01); *G06F 3/0634* (2013.01); *G06F 3/0679* (2013.01); *G06F 12/0862* (2013.01)

(58) Field of Classification Search
CPC .... G06F 3/0659; G06F 3/0613; G06F 3/0634; G06F 3/0679; G06F 12/0862
See application file for complete search history.

(56) References Cited

U.S. PATENT DOCUMENTS

| | | | |
|---|---|---|---|
| 9,021,150 B2 | 4/2015 | Gibbons et al. | |
| 9,696,929 B2 | 7/2017 | Muroyama et al. | |
| 11,093,174 B1 | 8/2021 | Jang et al. | |
| 2008/0256307 A1* | 10/2008 | Fujimoto | G06F 3/0689 711/E12.001 |
| 2009/0083483 A1* | 3/2009 | Balakrishnan | G06F 11/1076 711/E12.002 |
| 2012/0042182 A1 | 2/2012 | Fulkerson et al. | |
| 2012/0179928 A1* | 7/2012 | Haustein | G06F 1/3268 713/320 |
| 2016/0196085 A1* | 7/2016 | Minamiura | G06F 3/0656 711/162 |

OTHER PUBLICATIONS

Weddle, Charles, et al. "PARAID: A gear-shifting power-aware RAID." ACM Transactions on Storage (TOS) 3.3 (2007): 13-es. (Year: 2007).*

(Continued)

*Primary Examiner* — Nicholas J Simonetti
(74) *Attorney, Agent, or Firm* — Kilpatrick Townsend & Stockton LLP

(57) ABSTRACT

Systems and methods are provided for managing write requests for drives in a cloud storage system. For example, a system can receive a plurality of write requests for writing a first set of data to a first drive of a plurality of drives. The first drive may be powered off. The system can write the first set of data to a cache in response to receiving the plurality of write requests. The system can determine that a number of the plurality of write requests exceeds a predetermined write request threshold. The system can power on the first drive in response to determining that the number of the plurality of write requests exceeds the predetermined write request threshold. The system can write the first set of data stored in the cache to the first drive.

17 Claims, 3 Drawing Sheets

(56) References Cited

OTHER PUBLICATIONS

Bakhshalipour, M., et al., "Reducing Writebacks through In-Cache Displacement," ACM Transactions on Design Automation of Electronic Systems, vol. 24, No. 2, Article 16, Jan. 2019, http://cs.ipm.ac.ir/~plotfi/papers/icd_todaes19.pdf.
Ge, X., et al., "DiscPOP: Power-Aware Buffer Management for Disk Accesses," IEEE, 2011, https://www.researchgate.net/publication/252039754_DiscPOP_Power-aware_buffer_management_for_disk_accesses.
Papathanasiou, A.E. and Scott, M.L., "Energy Efficient Prefetching and Caching," USENIX, 2004, http://citeseerx.ist.psu.edu/viewdoc/download?doi=10.1.1.297.7518&rep=rep1&type=pdf.

* cited by examiner

MANAGING WRITE REQUESTS FOR DRIVES IN CLOUD STORAGE SYSTEMS

TECHNICAL FIELD

The present disclosure relates generally to cloud storage systems. More specifically, but not by way of limitation, this disclosure relates to managing write requests for drives in cloud storage systems.

BACKGROUND

Cloud storage systems can include various types of memory devices, such as drives and caches, for storing data objects. A cloud storage system may write data onto and read data from the memory devices. In some examples, cloud storage systems may power off drives after a period of drive read and write inactivity. Caches may have a relatively low latency compared to drives and may be non-volatile (i.e., a cache can retain its data when powered off). Reading and writing data to a cache may be faster and less computationally expensive than reading and writing data to a drive.

DETAILED DESCRIPTION

Figure 1:
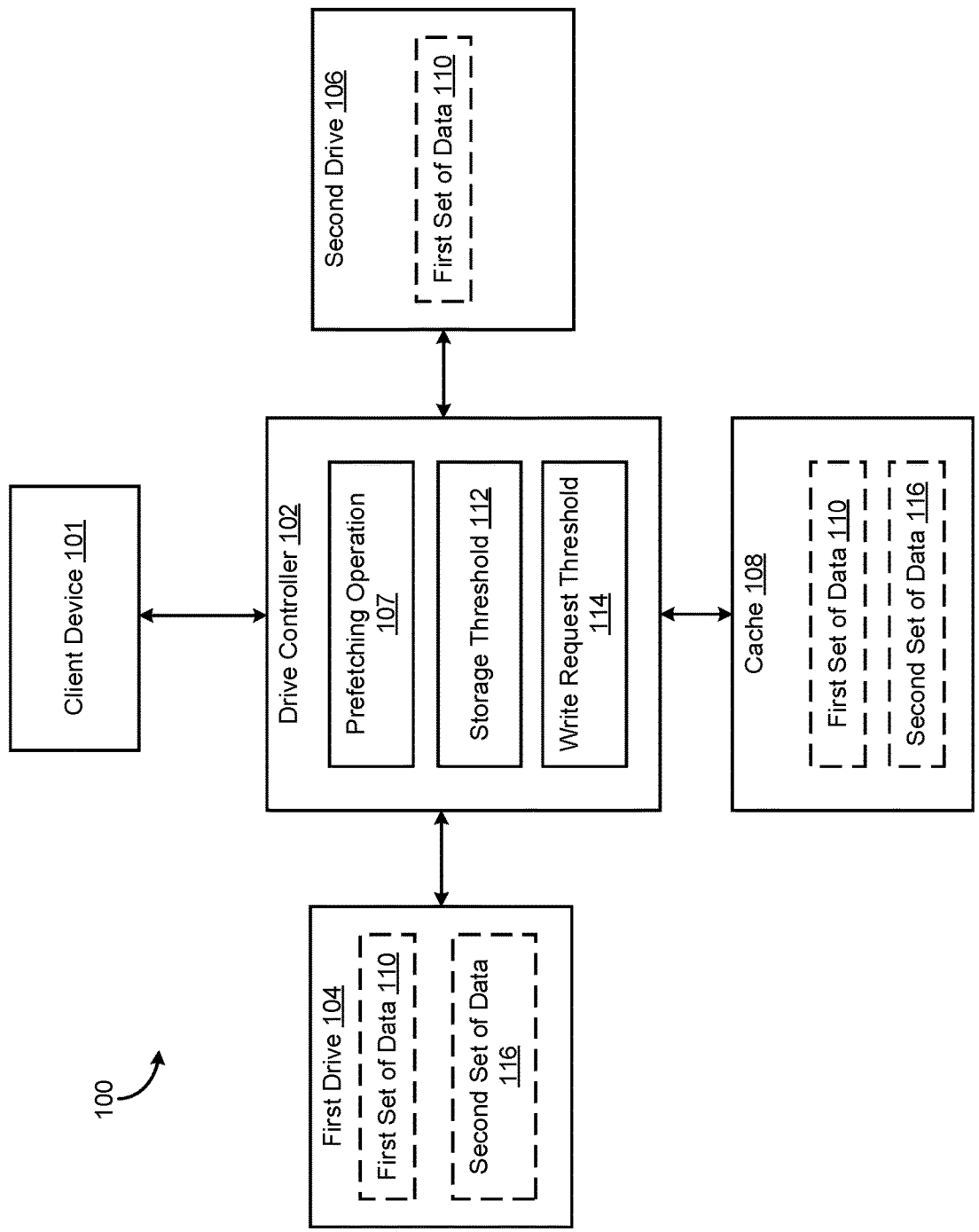
FIG. 1 is a block diagram of an example of a cloud storage system for managing write requests for drives according to some aspects of the present disclosure.

A cloud storage system may receive requests, such as from a client system, to read or write data to drives in the cloud storage system. In some examples, the cloud storage system may power off drives storing data based on drive inactivity. Drives may consume a significant amount of processing power and resources when powered on. A drive that is powered off may be powered on in response to a read or write request. But cloud storage systems may include high numbers of drives, and powering drives on and off for individual write requests may increase power consumption and increase latency for the cloud storage system.

Some examples of the present disclosure can overcome one or more of the abovementioned issues by providing a system that stores pending data from write requests for a powered-off drive to a cache until the drive is powered on. Reading from or writing to the cache may be less computationally expensive than reading from or writing to the drive. Rather than powering on a drive for a single write request, the drive may remain in an idle state until the system determines that the drive should be powered on. The drive may be powered on in response to an incoming read request or in response to the system receiving a threshold amount of write requests. The system may then write all of the pending data stored in the cache to the drives at once. This can significantly reduce the number of drives that are powered on at a given time and the length of time that drives are powered on, thus saving power and resource consumption for the cloud storage system. Additionally, writing all pending data currently stored in the cache to the drive at once may reduce overall write time, which may reduce latency in the cloud storage system.

In one particular example, a system may receive a write request from a client device. The write request may direct the cloud storage system to write data to a particular drive. The particular drive may be powered off. In some examples, instead of powering up the drive and writing the data to the drive, the system may write the data to a cache. The system may continue to receive write requests from the client device and responsively write data to the cache. After a threshold number of write requests has been received, the system may power up the drive and write all of the data stored in the cache from the write requests to the drive at once. Additionally or alternatively, the system may power up the drive and write all of the cache stored data to the drive after the cache storage exceeds a storage threshold. In other examples, the system may identify a second drive that is powered on after receiving a write request from the client device. The system may write the data associated with the write request to the second drive. The data may be stored in the second drive until the first drive is powered on. In some examples, the drive may be powered on in response to receiving a read request for the drive from the client device. The system may promptly process read requests, in contrast with the delayed processing of write requests described herein.

In some examples, the system may utilize a prefetching operation for accessing data in a drive before receiving a read request for the data. For example, the system may determine that data stored on a drive is likely to be requested in a future read request. The system may write the data to the cache from the drive for easier and faster access if the read request is received. While drives in the system are powered on, the system may increase prefetching operations for data that is likely to be requested in future read requests. This may aid in reducing latency if the system does later receive read requests for the prefetched data. Additionally, the system may disable prefetching operations for drives that are powered down. This may reduce consumption of computing resources by preventing excessive powering up of drives to prefetch data that may not be requested.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a cloud storage system 100 for managing write requests for drives according to some aspects of the present disclosure. The cloud storage system 100 may include a client device 101, a drive controller 102, a first drive 104, a second drive 106, and a cache 108. Examples of the client device 101 can include a laptop computer, desktop computer, server, mobile phone, etc. Examples of the first drive 104 and the second drive 106 can include a hard disk drive, solid-state drive, etc. The cache 108 may be a cache memory, random access memory (RAM), flash memory, etc. While some examples of the drives and the cache 108 are provided, the cache 108 may be any type of memory that is faster than the first drive 104 and the second drive 106. In some examples, the cache 108 may be a battery-backed cache or a non-volatile random-access memory that may retain data if the cloud storage system 100 is powered off. The drive controller 102 may coordinate reading or writing of data to the drives and the cache 108.

Some or all of the components of FIG. 1 may communicate with one another via a network, such as a local area network (LAN) or the Internet.

Initially, the first drive 104 may be powered off and the second drive 106 may be powered on. In some examples, the second drive 106 may be a spool drive. The drive controller 102 may receive one or more write requests from a client device 101. The write requests may direct the drive controller 102 to write a first set of data 110 to the first drive 104. Instead of powering on the first drive 104 to write the first set of data 110 thereto, the drive controller 102 may write the first set of data 110 to the cache 108. Additionally or alternatively, the drive controller 102 may write the first set of data 110 to the second drive 106.

In some examples, some or all data from the first set of data 110 may be replicated and written to one or more drives that are powered. For example, at least one data unit from the first set of data 110 can be replicated and written to the cache 108 and the second drive 106. When the first drive 104 is powered on, the drive controller 102 may write the first set of data 110 to the first drive 104 from the cache 108 or the second drive 106. The drive controller 102 may determine which instance of first set of data 110 to access for writing to the first drive 104. For example, if the second drive 106 is powered off, the drive controller 102 may write the first set of data 110 to the first drive 104 from the cache 108, to avoid powering on the second drive 106. Alternatively, if the first set of data 110 in the cache 108 is corrupted or is lost, the drive controller 102 may write the first set of data 110 to the first drive 104 from the second drive 106. In some examples, the drive controller 102 may determine which instance of the first set of data 110 is easier or faster to access. In this example, the drive controller 102 may access the first set of data 110 stored in the cache 108 faster than the first set of data 110 stored in the second drive 106. Thus, the drive controller 102 may access the first set of data 110 from the cache 108 to write to the first drive 104 after the first drive 104 is powered on.

Additionally or alternatively, the first set of data 110 may be erasure coded. For example, the drive controller 102 may split a particular data from the set of data 110 into multiple fragments. Some or all of the fragments may be encoded with additional data so that the original data can be reconstructed if some of the fragments become corrupted or are lost. Individual fragments may be distributed to different memory devices in the cloud storage system 100 that are powered on, such as the cache 108 or the second drive 106. In some examples, after the first drive 104 is powered on, the drive controller 102 may extract the first set of data 110 using one or more fragments stored in the cache 108 or the second drive 106. The drive controller 102 may determine the number of fragments needed to extract the first set of data 110 by using the total number of fragments, N, and the size of each fragment, K. Each fragment may have 1/K portion of the first set of data 110. If each fragment was stored in a different drive, only K fragments may be needed to extract the full first set of data 110. Therefore, the fragments stored on N−K number of drives may be unavailable due to drives being powered off, losing power, etc., and the drive controller 102 can extract the full first set of data 110 from the remaining drives. For example, the first set of data 110 may be fragmented into four fragments, with N=4. Each data fragment may include ½ of the data from the first set of data 110, with K=2. Thus, N−K=2. If the data fragments in more than a certain limit of drives, such as two drives, are available to the drive controller 102, the data fragments may remain stored in the drives without writing to the first drive 104. If less than the certain limit of drives are available to the drive controller 102, the drive controller 102 may power on the first drive 104, extract the first set of data 110 from the data fragments, and write the first set of data 110 to the first drive 104.

The first drive 104 may be powered off until the drive controller 102 determines that the first set of data 110 should be written to the first drive 104. The first set of data 110 may be stored on the cache 108 or the second drive 106 until the first drive 104 is powered on. In some examples, the drive controller 102 may determine that the storage amount in the cache 108 exceeds a storage threshold 112. The storage threshold may be predetermined, such as by a user of the client device 101 or the cloud storage system 100. In response to determining that the storage threshold 112 has been exceeded, the drive controller 102 may power on the first drive 104. The drive controller 102 may then write the first set of data 110 to the first drive 104 from the cache, thus freeing up storage space in the cache 108. Additionally or alternatively, the drive controller 102 may not power on the first drive 104 and may instead write the first set of data 110 to the second drive 106 to free up storage space in the cache 108. The drive controller 102 may write the first set of data 110 to the first drive 104 from the second drive 106 after the first drive 104 is powered on.

In other examples, the drive controller 102 may determine that a number of write requests received from the client device 101 exceeds a write request threshold 114. The write request threshold 114 may be predetermined, such as by a user of the client device 101 or the cloud storage system 100. In response to determining that the write request threshold 114 has been exceeded, the drive controller 102 may power on the first drive 104. The drive controller 102 may then write the first set of data 110 to the first drive 104, either from the cache 108, the second drive 106, or from a combination thereof.

Alternatively or additionally, the drive controller 102 may power on the first drive 104 in response to receiving a read request from the client device 101 for reading a second set of data 116 stored on the first drive 104. The drive controller 102 may read the second set of data 116 from the first drive 104. While the first drive 104 is powered on from the read request, the drive controller 102 may write the first set of data 110 to the first drive 104, either from the cache 108, the second drive 106, or from a combination thereof.

In some examples, the drive controller 102 may execute a prefetching operation 107 for prefetching data that may be requested in a future read request from the client device 101. A prefetching operation 107 can involve writing data to the cache 108 from data stored in a drive, such as the first drive 104 or the second drive 106, before receiving a read request for that data. When a read request for that data is received, the data may be read from the cache 108 rather than from a drive. Reading from the cache 108 may be faster and easier than reading from the drive. But, a prefetching operation 107 may require its associated drive to be powered on, and in some examples prefetching operations 107 may not distinguish between drives that are powered on and drives that are powered off. It may be beneficial to prioritize prefetching operations 107 for drives that are powered on, and disable prefetching operations 107 for drives that are not powered on. While a drive is powered on, such as in response to a read request, the drive controller 102 may increase the number of prefetching operations 107 for data stored in that drive. When the drive is powered off, such as for read/write inactivity, the drive controller 102 may prevent prefetching operations 107 for data in that drive.

For example, the drive controller 102 may determine, such as through a machine-learning process, that the client device 101 is likely to send a read request for the second set of data 116 stored in the first drive 104. If the drive controller 102 determines that the first drive 104 is powered off, the drive controller 102 may disable a prefetching operation 107 for the first drive 104 to keep the first drive 104 powered off as long as possible to reduce consumption of computing resources. If the drive controller 102 determines that the first drive 104 is powered on, the drive controller 102 may enable a prefetching operation 107 for prefetching the second set of data 116 from the first drive 104 and writing the second set of data 116 to the cache 108. In some examples, the client device 101 may send a read request for the second set of data 116 from the first drive 104. The drive controller 102 may then read the second set of data 116 from the cache 108 rather than the first drive 104, which may be powered off. In this manner, the processor 202 can significantly increase the number of prefetching operations 107 performed for drives that are powered on to allow those drives to then remain powered off for longer periods of time.

FIG. 1 is illustrative and non-limiting. Other examples may include more components, fewer components, different components, or a different arrangement of the components shown in FIG. 1. For example, although the cloud storage system 100 includes one client device, two drives, and one cache in the example of FIG. 1, the cloud storage system 100 may include any number of client devices, drives, or caches in other examples.

Figure 2:
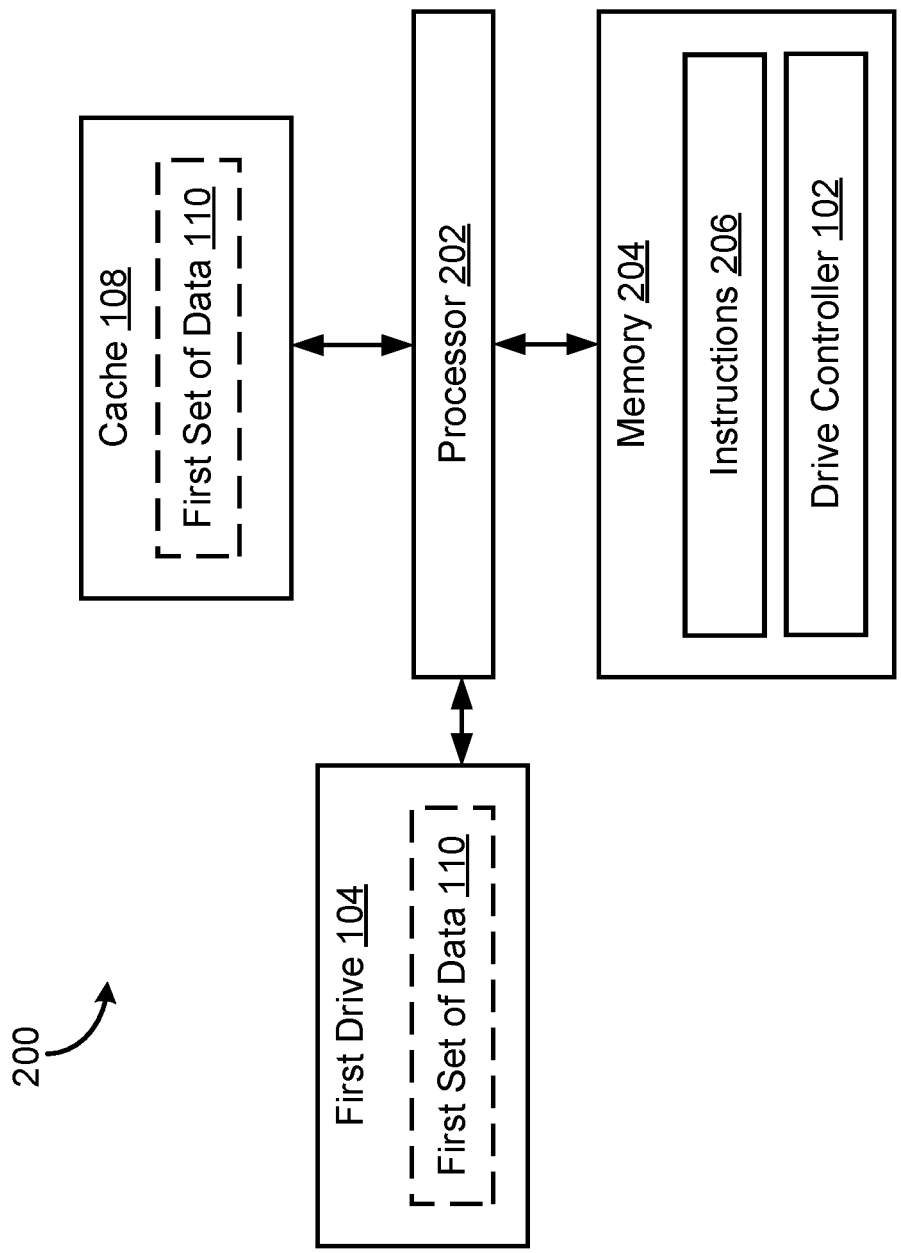
FIG. 2 is a block diagram of another example of a cloud storage system for managing write requests for drives according to some aspects of the present disclosure.

FIG. 2 is block diagram of another example of a cloud storage system 200 for managing write requests for drives according to some aspects of the present disclosure. The cloud storage system 200 includes a processor 202 that is communicatively coupled with a memory 204. The processor 202 may also be communicatively coupled to a first drive 104, a second drive 106, and a cache 108. In some examples, the components of FIG. 2 can be included in the same housing and form part of a same computing device. In other examples, the components of FIG. 2 can be distributed from (e.g., remote to) one another.

The processor 202 can include one processor or multiple processors. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. The instructions can include processor-specific instructions generated by a compiler or an interpreter from code written in any suitable computer-programming language, such as C, C++, C#, etc.

The memory 204 can include one memory or multiple memories. Non-limiting examples of the memory 204 can include electrically erasable and programmable read-only memory (EEPROM), flash memory, or any other type of non-volatile memory. At least some of the memory 204 includes a non-transitory computer-readable medium from which the processor 202 can read the instructions 206. The non-transitory computer-readable medium can include electronic, optical, magnetic, or other storage devices capable of providing the processor 202 with computer-readable instructions or other program code. Examples of the non-transitory computer-readable medium can include magnetic disks, memory chips, ROM, random-access memory (RAM), an ASIC, optical storage, or any other medium from which a computer processor can read the instructions 206.

In some examples, the processor 202 can execute the instructions 206 to perform operations. For example, the processor may execute the drive controller 102 to coordinate read and write requests for the first drive 104, the second drive 106, and the cache 108. The processor 202 may receive write requests, such as from the client device 101 in FIG. 1, for writing a first set of data 110 to the first drive 104. The first drive 104 may be powered off. The processor 202 may write the first set of data 110 to the cache 108 in response to receiving the write requests. The processor 202 may determine that a number of the write requests exceeds a predetermined write request threshold 114. The processor 202 may power on the first drive 104 in response to determining that the number of write requests exceeds the predetermined write request threshold 114. The processor 202 may then write the first set of data 110 stored in the cache 108 to the first drive 104.

Figure 3:
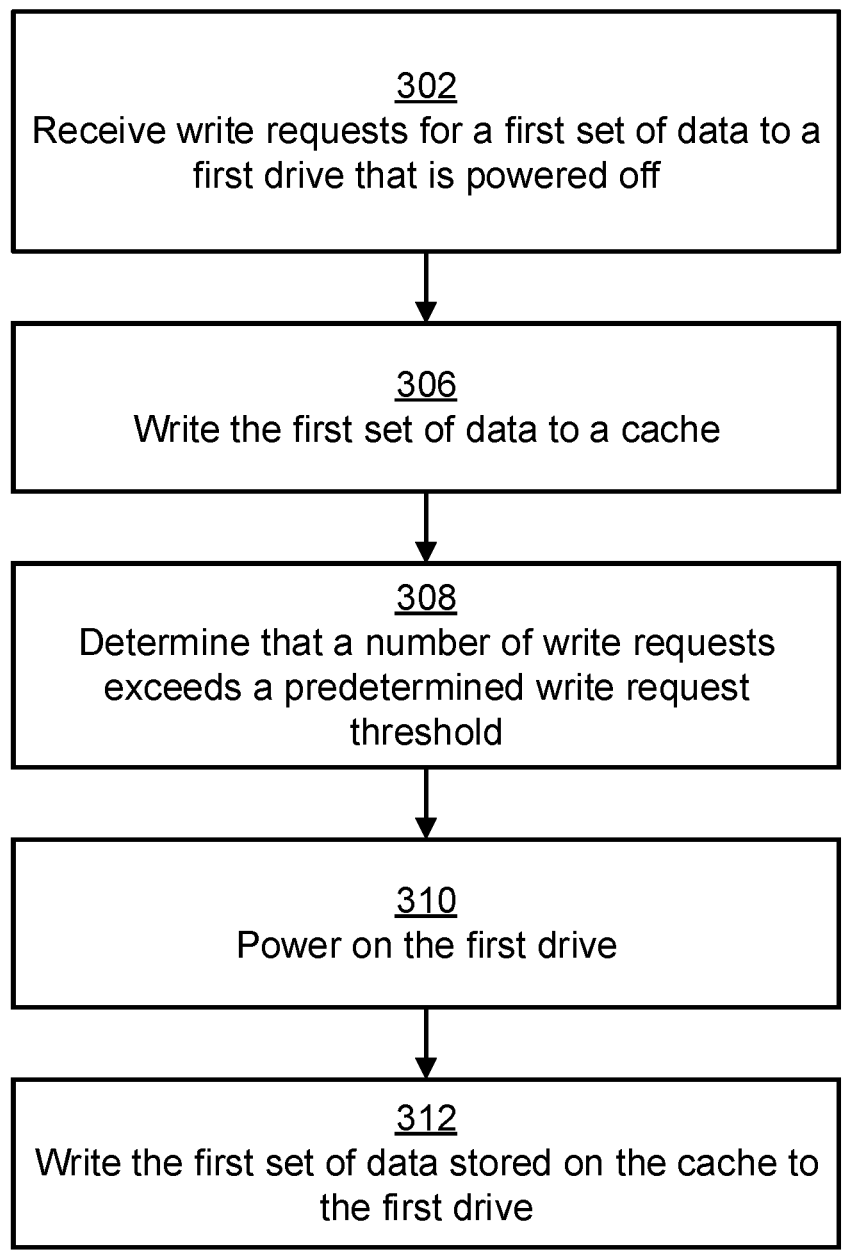
FIG. 3 is a flow chart showing an example of a process for managing write requests for drives according to some aspects of the present disclosure.

The processor 202 can implement some or all of the steps shown in FIG. 3. Other examples can include more, fewer, or different steps than the steps depicted in FIG. 3. The steps below are described with reference to components described above with regard to FIGS. 1-2.

Turning to FIG. 3, in block 302 the processor 202 receives write requests for a first set of data 110 to a first drive 104 that is powered off. The write requests may be received from a client device 101. The write requests may be received intermittently over time, and the first set of data 110 may include all pending data requested in the write requests.

In block 304, the processor 202 writes the first set of data 110 to the cache 108. For example, each time a write request is received from a client device 101, the processor 202 may write the data requested in the write request to the cache 108. Alternatively or additionally, the processor 202 may write the first set of data 110 to a second drive 106, which may be powered on. In some examples, some data in the first set of data 110 may be erasure coded and split between the cache 108 and the second drive 106 to increase redundancy in case of system failure leading to loss of data. In some examples, the first set of data 110 may include metadata indicating that the first set of data 110 should be written to the first drive 104.

In block 308, the processor 202 determines that a number of write requests exceeds a predetermined write request threshold 114. The write request threshold 114 may be predetermined by a user. Additionally or alternatively, the processor 202 may determine that a storage amount in the cache 108 exceeds a predetermined storage threshold 112. As the cache 108 may have limited storage, it may be beneficial to remove the first set of data 110 from the cache 108. In other examples, the processor 202 may receive a read request from the client device 101 for the first drive 104. Unlike processing write requests, it may be beneficial to process read requests as soon as possible.

In block 310, the processor 202 powers on the first drive 104. In block 312, the processor 202 writes the first set of data 110 stored on the cache 108 to the first drive 104. The cache 108 may remove the first set of data 110 from storage in the cache 108. If the processor 202 powered on the first drive 104 after receiving a read request, the processor 202 may write the first set of data 110 to the first drive 104 at a same time as processing the read request for the first drive 104. In some examples, while the first drive 104 is powered on, the processor 202 may increase prefetching operations 107 for prefetching data from the first drive 104 to be stored in the cache 108 or the second drive 106.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processor; and
a memory including instructions that are executable by the processor for causing the processor to:
receive a plurality of write requests for writing a first set of data to a first drive of a plurality of drives, the first drive being powered off;
in response to receiving the plurality of write requests, write the first set of data to a cache;
determine that a number of the plurality of write requests exceeds a predetermined write request threshold or that a storage amount in the cache exceeds a predetermined storage threshold;
in response to determining that the number of the plurality of write requests exceeds the predetermined write request threshold or that the storage amount exceeds the predetermined storage threshold, write the first set of data stored in the cache to a second drive of the plurality of drives, the second drive being powered on;
determine that the first drive is powered on; and
in response to determining that the first drive is powered on, write the first set of data stored in the second drive to the first drive.

2. The system of claim 1, wherein the memory further comprises instructions that are executable by the processor for causing the processor to:
in response to determining that the number of the plurality of write requests exceeds the predetermined write request threshold or that the storage amount in the cache exceeds the predetermined storage threshold, power on the first drive; and
write the first set of data stored in the cache or the second drive to the first drive.

3. The system of claim 1, wherein the cache is a battery-backed cache or a non-volatile random-access memory.

4. The system of claim 1, wherein the memory further comprises instructions that are executable by the processor for causing the processor to:
receive a read request for reading a second set of data from the first drive;
in response to receiving the read request, power on the first drive for reading the second set of data from the first drive; and
write the first set of data stored in the cache to the first drive.

5. The system of claim 4, wherein the memory further comprises instructions that are executable by the processor for causing the processor to:
determine that the first drive is powered off; and
disable a prefetching operation for prefetching the second set of data from the first drive to be written to the cache prior to receiving a read request for reading the second set of data from the first drive.

6. The system of claim 4, wherein the memory further comprises instructions that are executable by the processor for causing the processor to:
determine that the first drive is powered on; and
enable a prefetching operation for prefetching the second set of data from the first drive to be written to the cache prior to receiving a read request for reading the second set of data from the first drive.

7. A method comprising:
receiving, by a processor, a plurality of write requests for writing a first set of data to a first drive of a plurality of drives, the first drive being powered off;
in response to receiving the plurality of write requests, writing, by the processor, the first set of data to a cache;
determining, by the processor, that a number of the plurality of write requests exceeds a predetermined write request threshold or that a storage amount in the cache exceeds a predetermined storage threshold;
in response to determining that the number of the plurality of write requests exceeds the predetermined write request threshold or that the storage amount exceeds the predetermined storage threshold, writing, by the processor, the first set of data stored in the cache to a second drive of the plurality of drives, the second drive being powered on;
determine that the first drive is powered on; and
in response to determining that the first drive is powered on, writing, by the processor, the first set of data stored in the second drive to the first drive.

8. The method of claim 7, further comprising:
in response to determining that the number of the plurality of write requests exceeds the predetermined write request threshold or that the storage amount in the cache exceeds the predetermined storage threshold, powering on the first drive; and
writing the first set of data stored in the cache or the second drive to the first drive.

9. The method of claim 7, wherein the cache is a battery-backed cache or a non-volatile random-access memory.

10. The method of claim 7, further comprising:
receiving a read request for reading a second set of data from the first drive;
in response to receiving the read request, powering on the first drive for reading the second set of data from the first drive; and
writing the first set of data stored in the cache to the first drive.

11. The method of claim 10, further comprising:
determining that the first drive is powered off; and
disabling a prefetching operation for prefetching the second set of data from the first drive to be written to the cache prior to receiving a read request for reading the second set of data from the first drive.

12. The method of claim 10, further comprising:
determining that the first drive is powered on; and
enabling a prefetching operation for prefetching the second set of data from the first drive to be written to the cache prior to receiving a read request for reading the second set of data from the first drive.

13. A non-transitory computer-readable medium comprising program code that is executable by a processor for causing the processor to:
receive a plurality of write requests for writing a first set of data to a first drive of a plurality of drives, the first drive being powered off;
in response to receiving the plurality of write requests, write the first set of data to a cache;
determine that a number of the plurality of write requests exceeds a predetermined write request threshold or that a storage amount in the cache exceeds a predetermined storage threshold;
in response to determining that the number of the plurality of write requests exceeds the predetermined write request threshold or that the storage amount exceeds the predetermined storage threshold, write the first set of data stored in the cache to a second drive of the plurality of drives, the second drive being powered on;
determine that the first drive is powered on; and
in response to determining that the first drive is powered on, write the first set of data stored in the second drive to the first drive.

14. The non-transitory computer-readable medium of claim 13, further comprising program code that is executable by the processor for causing the processor to:
in response to determining that the number of the plurality of write requests exceeds the predetermined write request threshold or that the storage amount in the cache exceeds the predetermined storage threshold, power on the first drive; and
write the first set of data stored in the cache or the second drive to the first drive.

15. The non-transitory computer-readable medium of claim 13, wherein the cache is a battery-backed cache or a non-volatile random-access memory.

16. The non-transitory computer-readable medium of claim 13, further comprising program code that is executable by the processor for causing the processor to:
receive a read request for reading a second set of data from the first drive;
in response to receiving the read request, power on the first drive for reading the second set of data from the first drive; and
write the first set of data stored in the cache to the first drive.

17. The non-transitory computer-readable medium of claim 16, further comprising program code that is executable by the processor for causing the processor to:
determine that the first drive is powered off; and
disable a prefetching operation for prefetching the second set of data from the first drive to be written to the cache prior to receiving a read request for reading the second set of data from the first drive.

* * * * *